US012157405B2

(12) United States Patent
Beaurenaut et al.

(10) Patent No.: US 12,157,405 B2
(45) Date of Patent: Dec. 3, 2024

(54) ANTI-SUBMARINING APPARATUS FOR A VEHICLE

(71) Applicant: Faurecia Sièges d'Automobile, Nanterre (FR)

(72) Inventors: Thomas Beaurenaut, Luxeuil les Bains (FR); Jeremy Druet, Montbeliard (FR); Jaouad El Harfi, Belfort (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 810 days.

(21) Appl. No.: 17/162,136

(22) Filed: Jan. 29, 2021

(65) Prior Publication Data

US 2021/0237628 A1 Aug. 5, 2021

(30) Foreign Application Priority Data

Jan. 31, 2020 (FR) ..................................... 20 00999

(51) Int. Cl.
*B60N 2/42* (2006.01)
*B60N 2/68* (2006.01)

(52) U.S. Cl.
CPC ......... *B60N 2/4263* (2013.01); *B60N 2/4221* (2013.01); *B60N 2/68* (2013.01)

(58) Field of Classification Search
CPC ............. B60N 2/42718; B60N 2/4263; B60N 2/4221; B60N 2/68
See application file for complete search history.

(56) References Cited

U.S. PATENT DOCUMENTS

| | | | | | |
|---|---|---|---|---|---|
| 4,623,192 A | * | 11/1986 | Koide | ..................... | B60R 22/26 297/464 |
| 5,400,490 A | * | 3/1995 | Burchi | .................... | B29C 44/08 264/46.7 |
| 5,827,546 A | * | 10/1998 | Burchi | ..................... | B60N 2/70 264/46.7 |
| 5,827,547 A | * | 10/1998 | Burchi | ................ | B29C 44/1257 264/46.7 |
| 6,450,573 B1 | * | 9/2002 | Yamaguchi | ........ | B60N 2/42781 297/216.1 |
| 6,623,675 B2 | * | 9/2003 | Kobayashi | ........... | B60N 2/7017 264/46.4 |

(Continued)

FOREIGN PATENT DOCUMENTS

| | | |
|---|---|---|
| CN | 103921699 A | 7/2014 |
| WO | 9419209 A1 | 9/1994 |
| WO | 2011112462 A1 | 9/2011 |

OTHER PUBLICATIONS

French Search Report corresponding to French Application No. FR 2000999, dated Sep. 23, 2020, 2 pages.

*Primary Examiner* — Gregory A Blankenship
(74) *Attorney, Agent, or Firm* — Reising Ethington P.C.

(57) ABSTRACT

A support element of a vehicle seat includes a body formed by a flexible supporting element and a rigid reinforcing element, with the flexible supporting element defining a cavity extending into a part of the body, the rigid reinforcing element extending into the cavity and being formed by a material that is stiffer than the flexible supporting element and having an affinity with the flexible supporting element. The body is further formed of at least one reinforcing ply extending against at least a part of the rigid reinforcing element.

17 Claims, 7 Drawing Sheets

(56) References Cited

U.S. PATENT DOCUMENTS

| | | | | |
|---|---|---|---|---|
| 8,540,318 | B2* | 9/2013 | Folkert | B60N 2/7035 |
| | | | | 297/452.52 |
| 10,703,233 | B1* | 7/2020 | Booth | B60N 2/4214 |
| 10,974,421 | B2* | 4/2021 | Tobimatsu | B29C 44/1271 |
| 11,130,430 | B2* | 9/2021 | Cha | B60N 2/72 |
| 2001/0005097 | A1* | 6/2001 | Heilig | B60N 2/4221 |
| | | | | 297/452.55 |
| 2004/0061364 | A1* | 4/2004 | Humer | B60N 2/4228 |
| | | | | 297/216.14 |
| 2005/0140199 | A1* | 6/2005 | Kang | B60N 2/4263 |
| | | | | 297/452.27 |
| 2008/0277955 | A1* | 11/2008 | Sato | B60R 13/0256 |
| | | | | 296/1.08 |
| 2011/0221254 | A1* | 9/2011 | Lindsay | B29C 44/0461 |
| | | | | 297/452.48 |
| 2013/0175838 | A1* | 7/2013 | Oshima | B60N 2/7094 |
| | | | | 297/284.3 |
| 2014/0132054 | A1* | 5/2014 | Steinmeier | B60N 2/4263 |
| | | | | 297/452.48 |
| 2016/0143442 | A1* | 5/2016 | Nakada | B64D 11/0647 |
| | | | | 297/452.48 |
| 2021/0237628 | A1* | 8/2021 | Beaurenaut | B60N 2/4263 |
| 2022/0227269 | A1* | 7/2022 | Ishizuka | B60N 2/42 |

\* cited by examiner

ANTI-SUBMARINING APPARATUS FOR A VEHICLE

TECHNICAL FIELD

The following disclosure relates to a support element for a vehicle seat.

BACKGROUND

"Submarining" refers to the sliding of a seat occupant under the lap portion of the seat belt during impact on the vehicle, thereby reducing the effectiveness of the seat belt in the event of this impact. This is because the pelvis of a passenger sitting on a vehicle seat sinks slightly into a support element of the seat. In a conventional support element, adhesion between a flexible supporting element and a rigid reinforcing element of the seat is limited due to the use of dissimilar materials, such as polyurethane (PU) for the supporting element and expanded polypropylene (EPP) for the reinforcing element, which reduces the strength and increases the cost of the support element as a whole.

SUMMARY

One object of the invention is thus to provide a reliable support element, whose manufacture is simple and whose cost of realization is reduced.

To this end, embodiments of the invention relate to a support element in which the body is formed of at least one reinforcing ply extending against at least part of the rigid reinforcing element.

In the support element according to at least some embodiments of the invention, the adhesion between the flexible supporting element and the rigid reinforcing element is improved since these two elements are formed by materials that have a high affinity. The reinforcing ply may improve the strength of the rigid reinforcing element.

In the event of an impact, the reinforcing ply may act as an additional reinforcement. In particular, the reinforcing ply makes it possible to reinforce the rigid reinforcing element and avoid the rupture thereof by maintaining its structural cohesion in the event of an impact. In this way, the reinforcing element retains its mechanical properties during impact and can effectively prevent the phenomenon of submarining.

The following features may be included in various embodiments of the invention, taken alone or in any technically feasible combination:

- the flexible supporting element comprises an outer face forming a support surface and a wall defining the cavity, and the rigid reinforcing element comprises an outer face extending against at least part of the wall of the flexible supporting element, and an inner face opposite the outer face;
- the reinforcing ply extends against at least a portion of the inner face of the rigid reinforcing element;
- the reinforcing ply completely covers the rigid reinforcing element;
- the reinforcing ply is formed by a thermoformable material;
- the rigid reinforcing element is located in a lower end portion of the support element, the rigid reinforcing element having a thickness in an elevation direction smaller than that of the support element;
- the rigid reinforcing element has a thickness in an elevation direction variable in a longitudinal direction;
- the flexible supporting element is formed of a flexible polyurethane foam and the rigid reinforcing element is formed by a rigid polyurethane foam;
- the rigid reinforcing element comprises at least one fastening element extending from the body and intended to fasten the support element to a seat frame;
- the rigid reinforcing element comprises multiple fastening elements interconnected by a metal structure extending substantially within the rigid reinforcing element;
- the reinforcing ply is over-molded by the rigid reinforcing element; and
- the rigid reinforcing element is over-molded by the flexible supporting element.

Embodiments of the invention also relate to a method for manufacturing a support element comprising the steps of:
- arranging the reinforcing ply in a first mold cavity having the shape of the rigid reinforcing element,
- over-molding the reinforcing ply by the rigid reinforcing element in the first molding cavity,
- arranging the rigid reinforcing element over-molded on the reinforcing ply in a second mold cavity having the shape of the body of the support element,
- over-molding the rigid reinforcing element by the flexible supporting element.

BRIEF DESCRIPTION OF THE DRAWINGS

Other aspects and advantages of the invention will appear upon reading the following description, given as an example and with reference to the attached drawings, in which.

DETAILED DESCRIPTION

Figure 1:
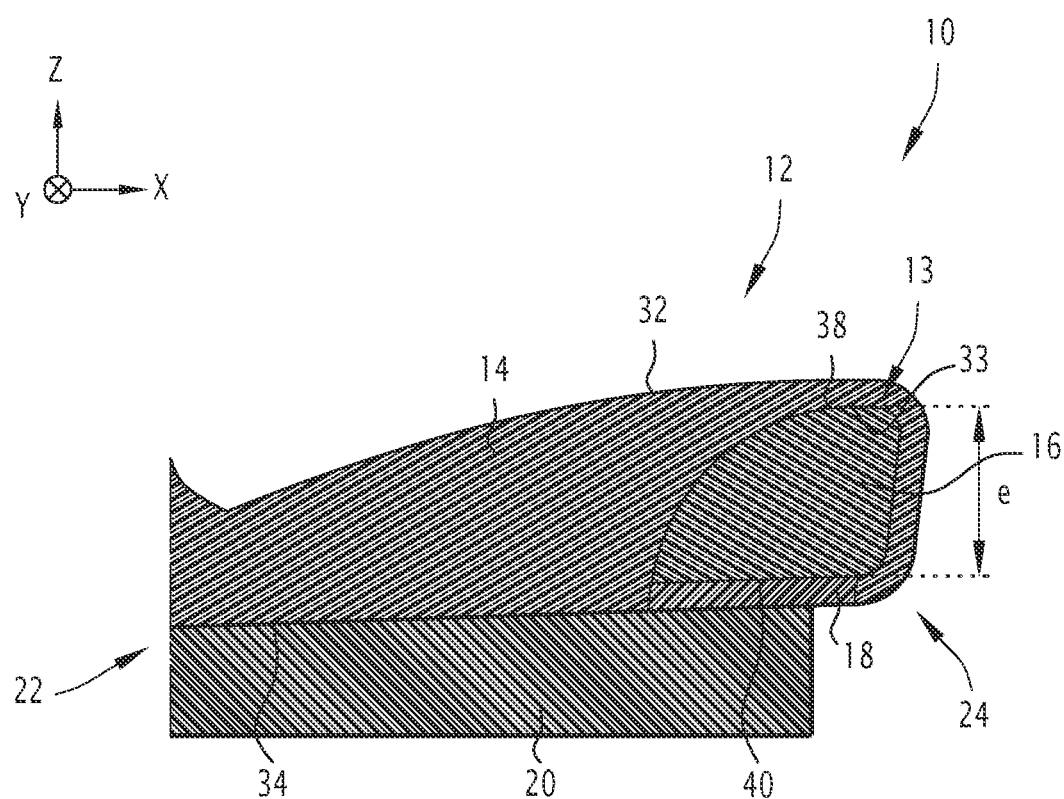
FIG. 1 is a schematic sectional drawing showing an elevation plane of a support element of a vehicle seat according to a first embodiment of the invention and arranged on a seat frame.

In the description, the terms "outer", "top" and "upper" refer to upward directions according to the direction of elevation Z of the vehicle which is, for example, vertical when the vehicle is resting on horizontal ground. The terms "internal", "bottom" and "lower" refer to downward directions in the Z elevation direction of the vehicle.

The longitudinal direction X is defined as the length of the vehicle. For example, the longitudinal direction X is horizontal when the vehicle is resting on horizontal ground and is extended in the usual direction of travel of the vehicle. The terms "front" and "rear" define directions towards the front of the vehicle or towards the rear of the vehicle respectively in the longitudinal direction X and under normal conditions of use of the vehicle.

The lateral direction Y is defined according to the width of the vehicle. This lateral direction Y is, for example, horizontal when the vehicle is resting on horizontal ground and is orthogonal to the longitudinal direction X. The terms "left" and "right" define directions respectively to the left of the vehicle or to the right of the vehicle in the longitudinal direction X and under normal conditions of use of the vehicle.

With reference to FIGS. 1 to 4, a support element 10 of a vehicle seat is described as comprising a body 12 formed of a flexible supporting element 14, at least one rigid reinforcing element 16, and at least one reinforcing ply 18.

The seat is intended, for example, to be mounted in a motor vehicle or in any other type of rail, sea or other vehicle, for example.

The support element 10 is the seat cushion, for example. The body 12 is thus the element on which a user of the seat can sit.

The flexible supporting element 14 extends from a rear end 22 of body 12 to a front end 24 of body 12. In addition, the flexible supporting element 14 extends from the left end 26 of the body 12 to the right end 28 of the body 12.

'Flexible' is understood as the support element 14 being elastically deformable when a force is applied to it.

The flexible supporting element 14 has an upward-facing outer face 32 and a downward-facing inner face 34 opposite the outer face 32.

The outer face 32 defines a support surface for the seat user. In particular, the outer face 32 can be shaped to comfortably accommodate the seat user. The outer face 32 includes a central area, for example, that is recessed in relation to a peripheral area around the central area. It is understood that other shapes are possible, such as a curved or other shape depending on the nature of the seat.

With reference to FIGS. 1 to 4, the flexible supporting element 14 defines a cavity 13 delimited by a wall 33.

The cavity 13 is extended, for example, into a front end part of the body 12. Cavity 13 is also extended, for example, from a left-hand end portion 26 of the body 12 to a right-hand end portion 28 of the body 12.

With reference to a first embodiment illustrated in FIG. 1, the cavity 13 is open on the side of the inner face 34 of the flexible supporting element 14. In particular, wall 33 closes cavity 13 towards the front, rear and top of the flexible supporting element 14. This means that cavity 13 is open towards the bottom of flexible supporting element 14.

The flexible supporting element 14 is made of a polymer material. For example, flexible supporting element 14 is made of flexible PU foam.

With reference to FIGS. 1 to 4, the rigid reinforcing element 16 extends into cavity 13 of the flexible supporting element 14. The rigid reinforcing element 16 extends, for example, in the front end 24 of the body 12 from the left end 26 of the body 12 to the right end 28 of the body 12. The rigid reinforcing element 16 is further located in a lower end part of body 12.

The rigid reinforcing element 16 is attached to the flexible supporting element 14.

With reference to FIGS. 1 to 3, 5 and 6, the rigid reinforcing element 16 comprises an outer face 38, an inner face 40 and at least one metal structure 42.

According to the first embodiment illustrated in FIG. 1, the outer face 38 of the rigid reinforcing element 16 extends against a part of the wall 33 of cavity 13 and faces upwards.

In particular, the outer face 38 of the rigid reinforcing element 16 fits the shape of the wall 33 of the cavity 13.

The inner face 40 of the rigid reinforcing element 16 is opposite the outer face 38 of the rigid reinforcing element 16 and faces downwards.

The inner face 40 of the rigid reinforcing element 16 is at least partially covered by the reinforcing ply 18.

The thickness of the flexible supporting element 14 is defined at a certain point of longitudinal X and lateral Y coordinates at which the cavity 13 is not located as being the distance between the outer face 32 and the inner face 34 in the elevation direction Z at the X, Y coordinates.

The thickness of the flexible supporting element 14 is defined at a certain point of longitudinal X and lateral Y coordinates at which cavity 13 is located as being the sum of the distance between the outer face 32 and the upper part of the wall 33 of cavity 13 and the distance between the lower part of the wall 33 of the cavity 13 and the inner face 34 in the direction of elevation Z at X, Y coordinates.

The thickness e of the rigid reinforcing element 16 at a certain point of longitudinal X and lateral Y coordinates is defined as the distance between the outer face 38 and the inner face 40 of the rigid reinforcing element 16 in the direction of elevation Z at X, Y coordinates.

The thickness of the reinforcing ply 18 at a certain point of longitudinal X and lateral Y coordinates is defined as the distance between a top end and a bottom end of the reinforcing ply 18 in the direction of elevation Z at X, Y coordinates.

The body 12 has a thickness defined as being the sum of the thickness of the reinforcing ply 18, the thickness of the reinforcement element 16 and the thickness of the flexible supporting element 14 in the area of the body 12 comprising the reinforcement element 16 and/or the reinforcing ply 18.

Outside this zone, the thickness of the body 12 is defined as being equal only to the thickness of the flexible supporting element 14.

In addition, the flexible supporting element 14 has a variable thickness (visible in FIGS. 1 to 3) in the longitudinal X and lateral Y direction.

The thickness e of the rigid reinforcing element 16 (visible in FIGS. 1 to 3) is variable in the longitudinal direction X. The thickness e of the rigid reinforcing element 16 is between 4 cm and 20 cm, preferably between 10 cm and 15 cm, in particular is equal to 12 cm and is less than the thickness of the body 12 of the support element 10. The thickness e can also be variable in the lateral direction Y.

In particular, the thickness e varies according to the longitudinal direction X from front to back in a gradually decreasing manner towards the rear. According to the embodiments illustrated in FIGS. 1 to 3, this gradual decrease is continuous. According to a variant illustrated in FIG. 6, this gradual decrease is not continuous.

The outer face of the body 12 is formed only of the outer face 32 of the flexible supporting element 14.

According to the first embodiment illustrated in FIG. 1, the inner face of the body 12 is formed by the reinforcing ply 18 in the zone of the body 12 comprising the rigid reinforcing element 16 and by the inner surface 34 of the flexible supporting element 14 outside this zone.

The rigid reinforcing element 16 is formed by a material that is stiffer than that of the flexible supporting element 14. 'Rigid' is understood as the rigid reinforcing element 16 being substantially non-deformable when a reasonable force is applied to it. A reasonable force is a force that is likely to be applied to the support element 10 under normal conditions of use of the support element 10, in particular when a passenger is seated on the support element 10. The rigid reinforcing element 16 is, for example, formed by a polymer material that is stiffer than that of flexible supporting element 14. For example, rigid reinforcement element 16 is made of a rigid PU foam.

The rigid reinforcing element 16 is over-molded by the flexible supporting element 14. The materials of the rigid reinforcing element 16 and the flexible supporting element 14 have an affinity for each other. 'Affinity' is understood as the adhesion between the rigid reinforcing element 16 and the flexible supporting element 14 being high. According to one example, the affinity between the rigid reinforcing element 16 and the flexible supporting element 14 is partly due to the fact that they are both made of PU foam. In particular, the adhesion between the rigid reinforcing element 16 and the flexible supporting element 14 is greater than when they are formed by different materials.

The metal structure 42 (partially visible in the body 12 in FIGS. 4 to 6 and fully visible in FIG. 7) extends substantially through the rigid reinforcing element 16 and comprises at least one fastening element 46.

Each fastening element 46 is, for example, made of a metallic material. The fastener 46 is, for example, made of steel.

Figure 4:
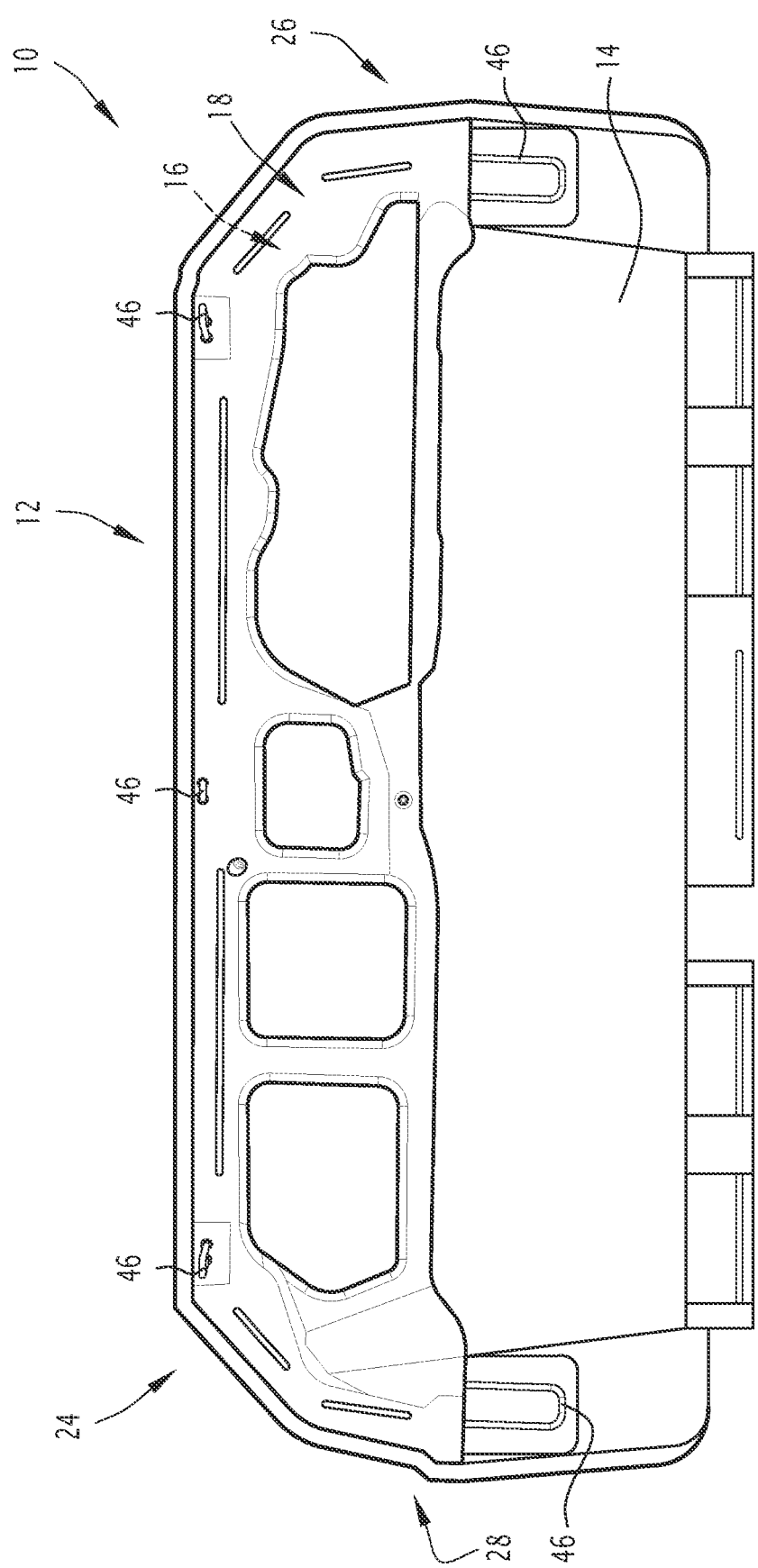
FIG. 4 is a schematic representation of the underside of the support element in FIG. 1.

Each fastener 46 protrudes from the rigid reinforcing element 16 and in particular protrudes from the body 12 as shown in FIG. 4. Each fastener 46 is intended to attach the rigid reinforcing element 16 and the flexible supporting element 14, which are attached to each other, to a seat frame 20 on which the inner side of the body 12 rests.

When the metal structure 42 comprises several fastening elements 46, the said fastening elements 46 are therefore connected to each other by the metal structure 42.

Figure 5:
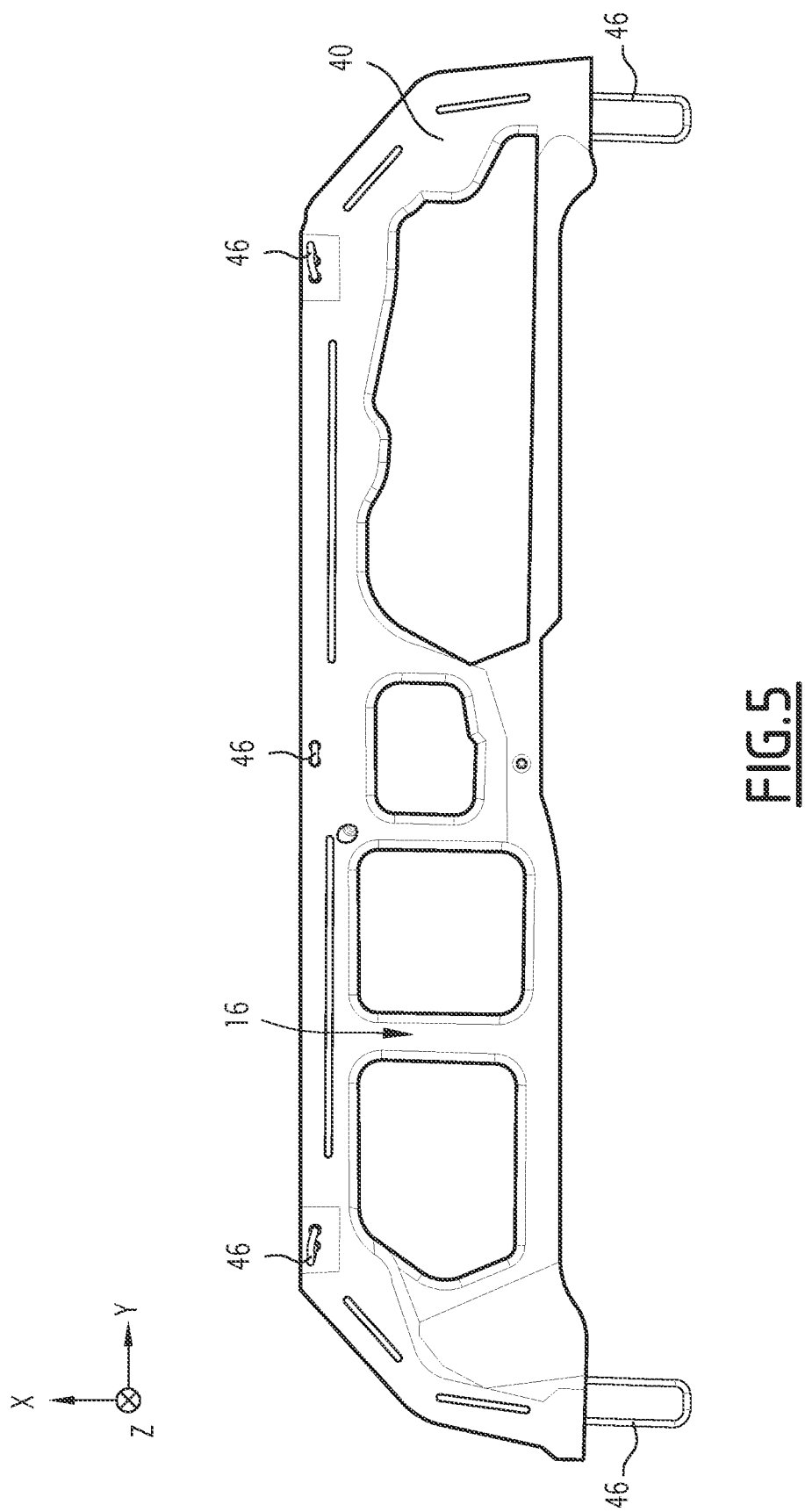
FIG. 5 is a schematic representation of the underside of a reinforcing element of the support element in FIGS. 1 to 4.
Figure 6:
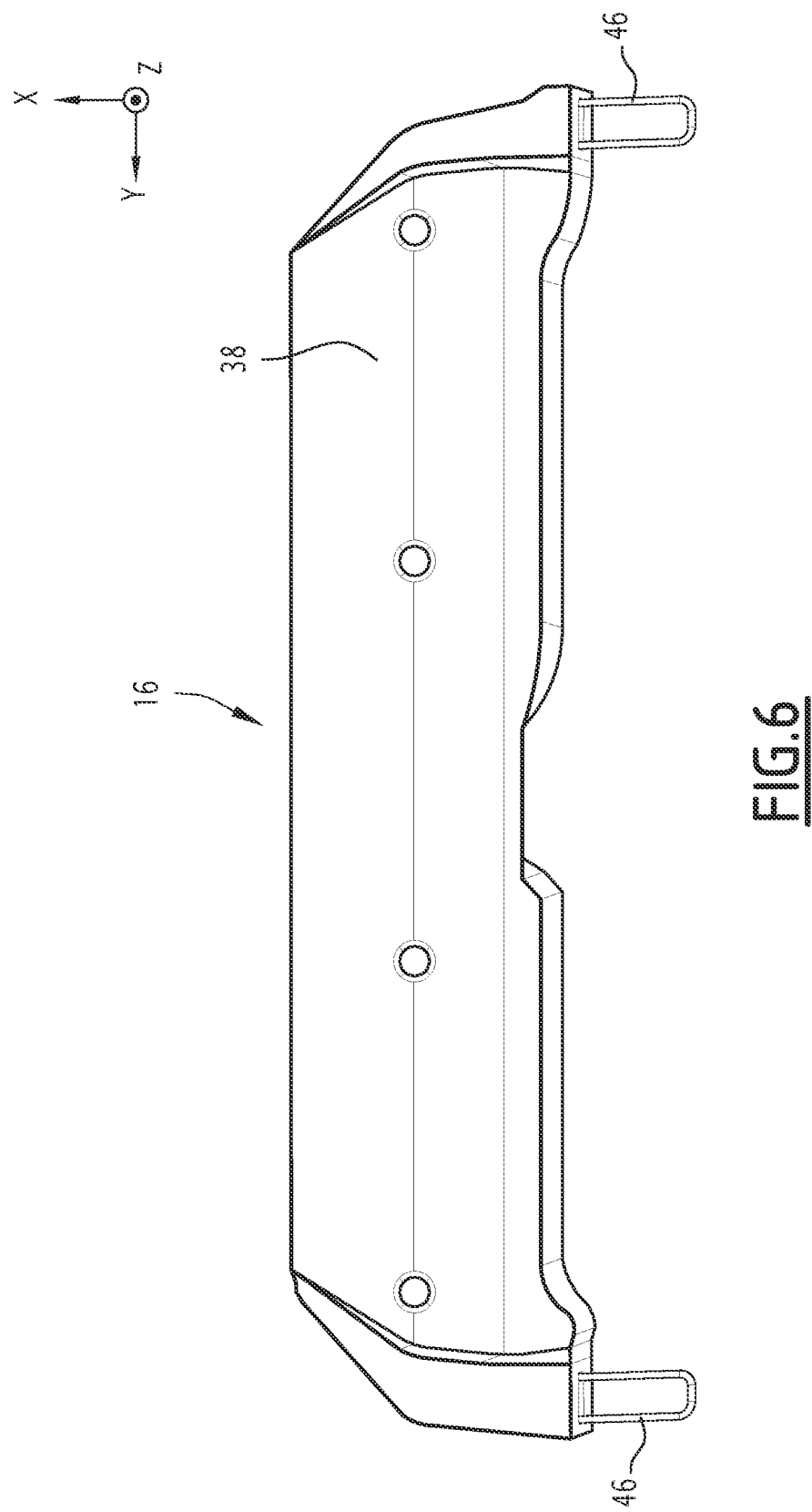
FIG. 6 is a schematic representation seen from above of the reinforcing element in FIG. 5.
Figure 7:
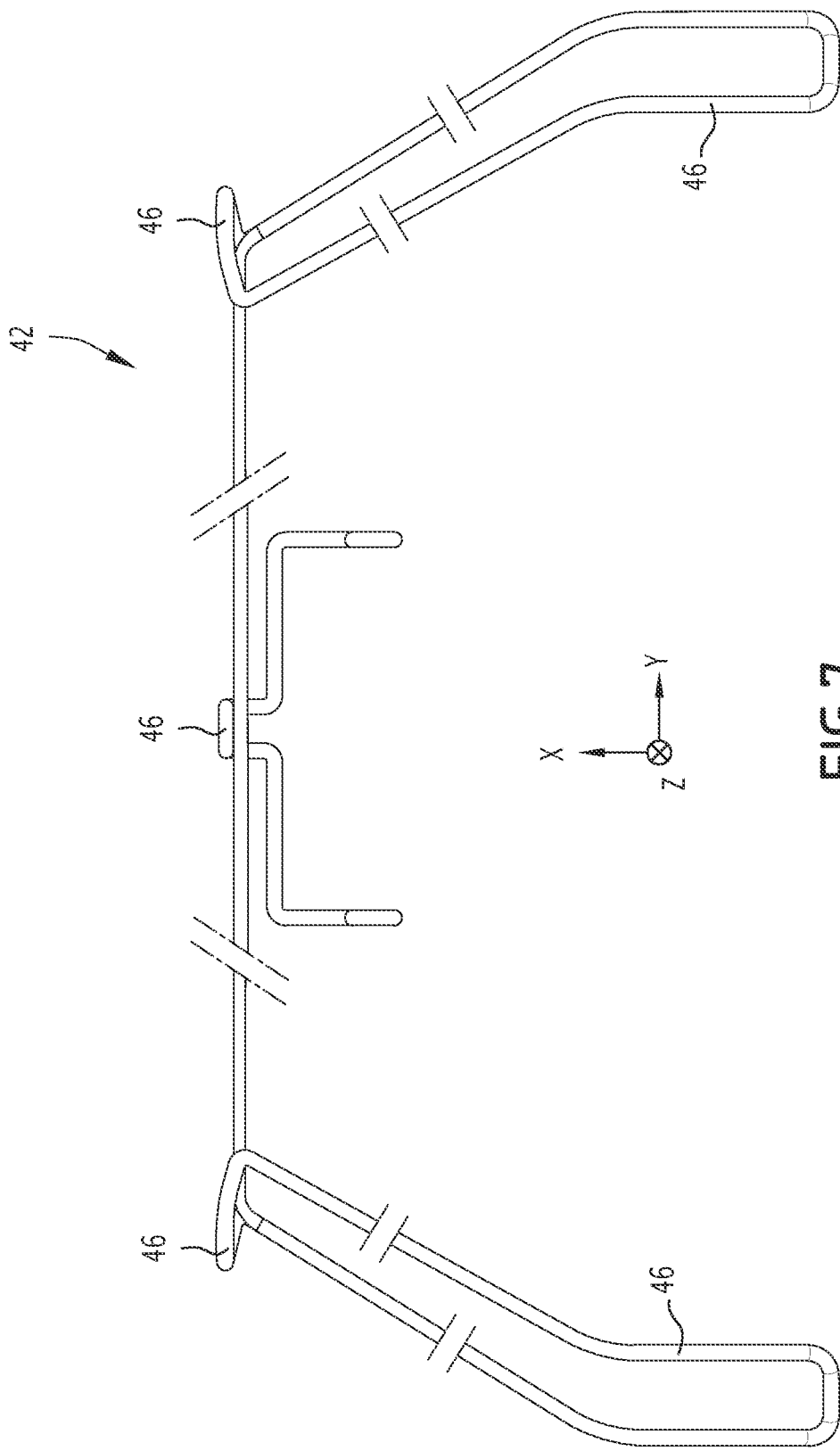
FIG. 7 is a schematic representation of the underside of a metal structure of the reinforcing element in FIGS. 4 to 6.

For example, fastener 46 is a hook for attaching the seat frame 20. The metal structure 42 has, for example, five fastening elements 46 as shown in FIGS. 4, 5 and 7, distributed on the inner side of the body 12.

In a variant not shown, the metal structure 42 is formed by several metal substructures. Two metal substructures are, for example, connected to each other by a retaining element made of a composite material. The retaining element is, for example, a chain link connecting one metal substructure to another. The retaining element is, for example, formed by a polypropylene-based material including glass fibers.

The reinforcing ply 18 (visible in FIGS. 1 to 4) extends against at least part of the inner face 40 of the rigid reinforcing element 16. The ply is flat, that is, one of its dimensions is smaller than the others. The ply is flexible so that it can be deformed to cover and fit the shape of another element. For example, reinforcing ply 18 covers at least part of the inner face 40 of the rigid reinforcing element 16 and fits the shape of that part.

In the first embodiment shown in FIG. 1, reinforcing ply 18 extends against part of the inner face 40 of the rigid reinforcing element 16. The reinforcing ply 18 is made of a polymer material. For example, the reinforcing ply 18 is formed of a polyester material. The reinforcing ply 18 can also be formed, for example, of a composite material comprising fibers embedded in a matrix. The fibers are, for example, formed of a co-polyester, polyamide or polyolefin-based material such as polyethylene or polypropylene. The choice of materials used to make the reinforcing ply 18 allows the mechanical characteristics of the ply to be modified in order to adapt it as well as possible to the rigid reinforcing element 16 to which it is applied.

The reinforcing ply 18 has a thickness that is less than the other two dimensions in which it extends. The ratio length or width to thickness is, for example, between 100 and 1000. For example, the thickness of the reinforcing ply 18 is between 1 mm and 6 mm.

The reinforcing ply 18 has a longitudinal tensile strength, that is, taken in longitudinal direction X, of more than 300 N/cm.

The reinforcing ply 18 has a transverse tensile strength, that is, taken in lateral direction Y, of more than 300 N/cm.

The reinforcing ply 18 has a longitudinal elongation at break, that is, measured in longitudinal direction X, of more than 50%.

The reinforcing ply 18 has a transverse elongation at break, that is, measured in lateral direction Y, of more than 60%.

According to the first embodiment illustrated in FIG. 1, the reinforcing ply 18 is over-molded by the rigid reinforcing element 16. In particular, the reinforcing ply 18 fits the shape of the inner face 40 of the rigid reinforcing element 16. When a user sits down on the support element 10, his pelvis is pressed slightly into the flexible supporting element 14. The user's pelvis is thus positioned approximately opposite or below the rigid reinforcing element and his or her thighs are supported on the outer face 38 of the rigid support element 16 through the flexible supporting element 14 in the reinforced area. When an impact takes place on the vehicle, in particular a frontal impact, a force directed in longitudinal direction X towards the front is applied to the user's pelvis. This causes the user to be thrown forward.

The outer face 38 of the rigid reinforcing element 16 then applies a reaction force to the user's thighs and pelvis, which is directed substantially backwards. The rigid reinforcing element 16 thus prevents the pelvis from shifting and thus prevents the user from sliding forwards in the seat, particularly under the lap belt's ventral side. The reinforcing ply 18 maintains the cohesion of the reinforcing element 16 during this impact, thus preventing it from tearing and ensuring that it can fulfil its function.

In the following, the manufacturing method for the support element 10 is described.

According to a first embodiment, the reinforcing ply 18 is placed in a first mold cavity in the shape of the rigid reinforcing element 16.

The metal structure 42 is also arranged in the first mold cavity.

A PU material is then injected into the first mold cavity over the reinforcing ply 18 and the metal structure 42 so that the PU material forms a rigid PU foam. The reinforcing ply 18 is thus over-molded by the rigid reinforcing element formed by the rigid PU foam 16 in the first mold cavity, which results in good adhesion of the reinforcing ply 18 to the rigid reinforcing element 16. The metal structure 42 is partially over-molded by the rigid reinforcing element 16 in the first molding cavity.

The assembly constituting the rigid reinforcing element 16 and the reinforcing ply 18 is then demolded and placed in a second mold cavity having the shape of the body 12 of the support element 10.

A PU material is then injected into the second mold cavity on the rigid reinforcing element 16, which is over-molded on the reinforcing ply 18, so that the PU material forms a flexible PU foam. The flexible supporting element 14 formed by the flexible PU foam is over-molded onto the rigid reinforcing element 16 and the reinforcing ply 18. Thus, the flexible supporting element 14 and the rigid reinforcing element 16 are made of the same material. The adhesion between the flexible supporting element 14 and the rigid reinforcing element 16 is therefore optimized, particularly in comparison with that of a state-of-the-art support element.

Figure 2:
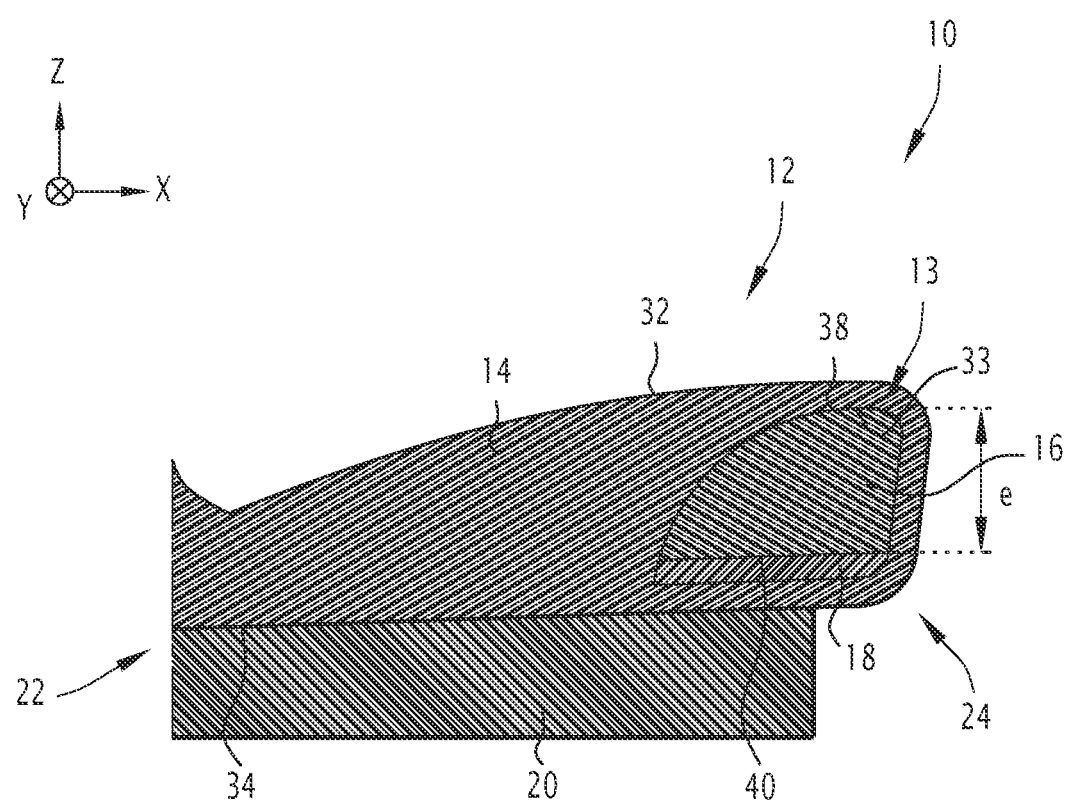
FIG. 2 is a schematic sectional drawing showing an elevation plane of a support element of a vehicle seat according to a second embodiment of the invention and arranged on a seat frame.

According to a second embodiment of the support element 10 shown in FIG. 2, the cavity 13 is closed and extends completely into the flexible supporting element 14. The rigid reinforcing element 16 and the reinforcing ply 18 extending into the cavity 13 are then encapsulated by the flexible supporting element 14.

The outer face 38 of the rigid reinforcing element 16 extends against part of the wall 33 of the cavity 13 and faces upwards. In particular, the outer surface 38 of the rigid reinforcing element 16 fits the shape of this part of wall 33 of cavity 13.

According to this second embodiment, the inner face of the body 12 is entirely formed by the inner face 34 of the flexible supporting element 14.

The reinforcing ply 18 extends against at least part of the inner face 40 of the rigid reinforcing element 16 and against at least part of the wall 33 of the flexible supporting element 14.

The reinforcing ply 18 is over-molded by the rigid reinforcing element 16. In particular, the reinforcing ply 18 fits the shape of the inner face 40 of the rigid reinforcing element 16.

Figure 3:
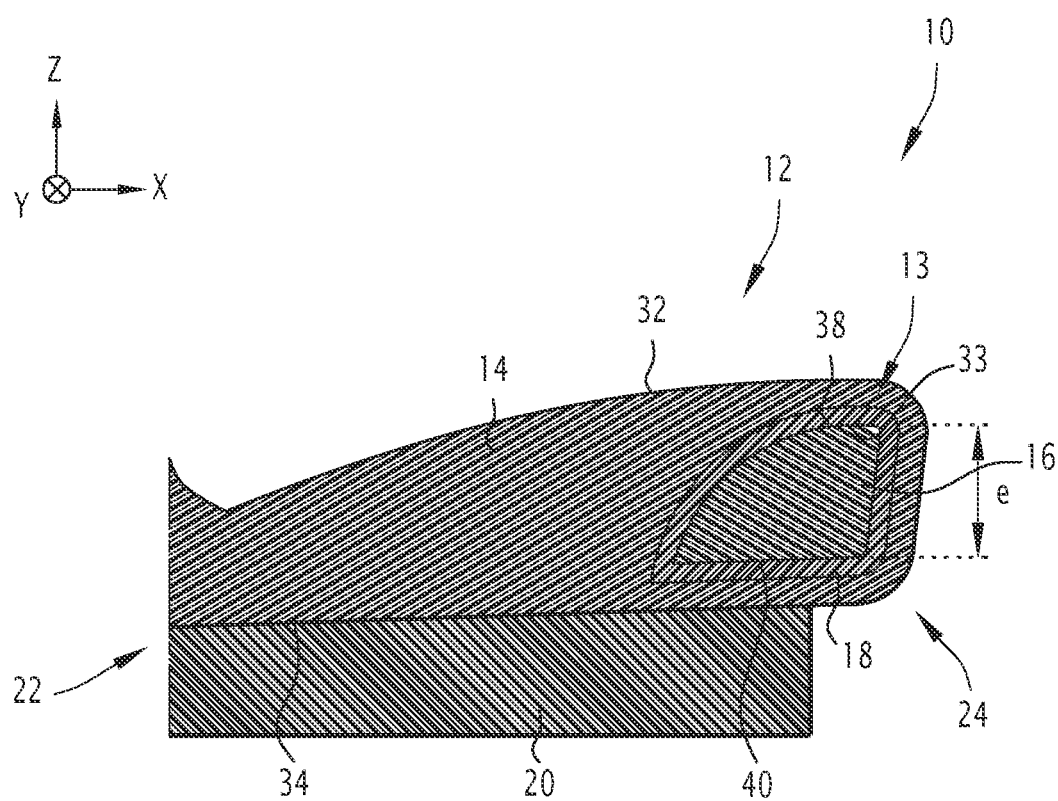
FIG. 3 shows a schematic sectional drawing showing an elevation plane of a support element of a vehicle seat according to a third embodiment of the invention and arranged on a seat frame.

According to a third embodiment of the support element 10 shown in FIG. 3, the cavity 13 is closed and extends completely into the flexible element 14. The rigid reinforcing element 16 and the reinforcing ply 18 extending into cavity 13 are then encapsulated by the flexible supporting element 14.

The outer face 38 of the rigid reinforcing element 16 is completely covered by the reinforcing ply 18 which is in direct contact with the entire wall 33 of the cavity.

According to this third embodiment, the inner face of the body 12 is entirely formed by the inner face 34 of the flexible supporting element 14.

The reinforcing ply 18 encapsulates the rigid reinforcing element 16 so that the reinforcing ply 18 completely covers rigid reinforcing element 16. In particular, the reinforcing ply 18 extends against the outer face 38 and the inner face 40 of the rigid reinforcing element 16. In particular, the reinforcing ply 18 fits the shape of the rigid reinforcing element 16.

The reinforcing ply 18 is attached to the rigid reinforcing element 16.

In this third embodiment, the thickness of the reinforcing ply 18 is taken from the smallest dimension of the reinforcing ply 18.

In a fourth embodiment, not shown, the cavity 13 is open. In particular, the cavity 13 is open towards the front and the bottom of the flexible supporting element 14. The wall 33 closes the cavity 13 towards the rear and the top of the flexible supporting element 14.

In this fourth embodiment, the reinforcing ply 18 encapsulates the rigid reinforcing element 16. Thus, the inner face of the body 12 is formed by the reinforcing ply 18 in the area of the body 12 containing the rigid reinforcing element 16 and by the inner face 34 of the flexible supporting element 14 outside this area.

In a second embodiment of the method, a PU material is injected into the second mold cavity on the rigid reinforcing element 16 over-molded on the reinforcing ply 18 so that the PU material forms a flexible PU foam that encapsulates the rigid reinforcing element 16 and the reinforcing ply 18. The flexible supporting element 14 formed by the flexible PU foam is thus over-molded onto the rigid reinforcing element 16 and the reinforcing ply 18.

According to a third embodiment of the method, in contrast to the second embodiment, the reinforcing ply 18 is applied and fixed to the rigid reinforcing element 16, which is pre-molded in such a way that the reinforcing ply 18 encapsulates and completely covers the rigid reinforcing element 16.

The assembly consisting of the rigid reinforcing element 16 and the reinforcing ply 18 is then placed in the second mold cavity.

A PU material is then injected into the second mold cavity over the rigid reinforcing element 16 and the reinforcing ply 18 so that the PU material forms a flexible PU foam that encapsulates the rigid reinforcing element 16 and the reinforcing ply 18. The flexible supporting element 14 formed by the flexible PU foam is thus over-molded onto the rigid reinforcing element 16 and the reinforcing ply 18 and encapsulates the rigid reinforcing element 16 and the reinforcing ply 18.

The seat support element 10 is thus simple to manufacture and has increased impact resistance. It allows the rigid reinforcing element 16 to fulfil its role of protecting the passenger by preventing submarining even in the event of a major impact on the vehicle.

The invention claimed is:

1. A support element of a vehicle seat, comprising:
    a body formed of a flexible supporting element and a rigid reinforcing element,
    the flexible supporting element defining a cavity extending into a part of the body,
    the rigid reinforcing element extending into the cavity and being formed of a material that is stiffer than the flexible supporting element and having an affinity with the flexible supporting element,
    wherein the body is further formed of at least one flat reinforcing ply extending against at least a part of the rigid reinforcing element.

2. The support element according to claim 1, wherein:
    the flexible supporting element comprises an outer face forming a support surface and a wall defining the cavity,
    the rigid reinforcing element comprises an outer face extending against at least part of the wall of the flexible supporting element, and an inner face opposite the outer face.

3. The support element according to claim 2, wherein the flat reinforcing ply extends against at least a portion of the inner face of the rigid reinforcing element.

4. The support element according to claim 1, wherein the flat reinforcing ply has a thickness of between 1 mm and 6 mm.

5. The support element according to claim 1, wherein the flat reinforcing ply is formed of a thermoformable material.

6. The support element according to claim 1, wherein the rigid reinforcing element is located in a lower end portion of the support element, the rigid reinforcing element having a thickness in an elevation direction smaller than that of the support element.

7. The support element according to claim 1, wherein the rigid reinforcing element has a thickness in an elevation direction variable in a longitudinal direction.

8. The support element according to claim 1, wherein the flexible supporting element is formed of a flexible polyurethane foam and the rigid reinforcing element is formed by a rigid polyurethane foam.

9. The support element according to claim 1, wherein the rigid reinforcing element comprises at least one fastening element extending from the body and intended to fasten the support element to a seat frame.

10. The support element according to claim 9, wherein the rigid reinforcing element comprises multiple fastening elements interconnected by a metal structure extending substantially within the rigid reinforcing element.

11. The support element according to claim 1, in which the flat reinforcing ply is over-molded by the rigid reinforcing element.

12. The support element according to claim 1, in which the rigid reinforcing element is over-molded by the flexible supporting element.

13. A method of manufacturing the support element according to claim 1, comprising the steps of:
   arranging the flat reinforcing ply in a first mold cavity having the shape of the rigid reinforcing element,
   over-molding the flat reinforcing ply by the rigid reinforcement element in the first mold cavity,
   arranging the rigid reinforcing element over-molded on the flat reinforcing ply in a second mold cavity having the shape of the body of the support element, and
   over-molding the rigid reinforcing element by the flexible supporting element.

14. The support element according to claim 1, wherein the flat reinforcing ply has a thickness that is less than a length and a width of the reinforcing ply.

15. The support element according to claim 14, wherein a ratio of the length to the thickness or of the width to the thickness is in a range from 100 to 1000.

16. A support element of a vehicle seat comprising a body formed of a flexible supporting element and a rigid reinforcing element,
   the flexible supporting element defining a cavity extending into a part of the body,
   the rigid reinforcing element extending into the cavity and being formed of a material that is stiffer than the flexible supporting element and having an affinity with the flexible supporting element,
   wherein the body is further formed of at least one reinforcing ply extending against at least a part of the rigid reinforcing element, and
   wherein the reinforcing ply completely covers the rigid reinforcing element.

17. A method of manufacturing the support element according to claim 16, comprising the steps of:
   arranging the reinforcing ply in a first mold cavity having the shape of the rigid reinforcing element,
   over-molding the reinforcing ply by the rigid reinforcement element in the first mold cavity,
   arranging the rigid reinforcing element over-molded on the reinforcing ply in a second mold cavity having the shape of the body of the support element, and
   over-molding the rigid reinforcing element by the flexible supporting element.

* * * * *